(12) United States Patent
Oravecz (10) Patent No.: US 9,038,500 B1
(45) Date of Patent: May 26, 2015

(54) SYSTEM AND METHOD FOR CONTINUOUSLY VARIABLE MOTORIZED ADJUSTMENT OF MOTORCYCLE HANDLEBARS

(71) Applicant: Paul Oravecz, Los Angeles, CA (US)

(72) Inventor: Paul Oravecz, Los Angeles, CA (US)

(*) Notice: Subject to any disclaimer, the term of this patent is extended or adjusted under 35 U.S.C. 154(b) by 0 days.

(21) Appl. No.: 14/171,708

(22) Filed: Feb. 3, 2014

(51) Int. Cl.
    *B62K 21/16* (2006.01)
(52) U.S. Cl.
    CPC .......... *B62K 21/16* (2013.01); *Y10T 74/20792* (2015.01)
(58) Field of Classification Search
    CPC ........ B62K 11/14; B62K 21/22; B62K 21/16; B62K 19/32; B62K 23/02; B62K 2204/00; Y10T 74/2078; Y10T 74/20792; Y10T 74/20798; Y10T 74/20804; Y10T 74/2081; Y10T 74/20822; Y10T 74/20828; Y10T 74/2084
    USPC .................. 74/551.1, 551.3–551.7; 180/19.3; 280/47.315, 47.371
    See application file for complete search history.

(56) References Cited

U.S. PATENT DOCUMENTS 8,181,981 B2 * 5/2012 Stenberg .................... 280/281.1

FOREIGN PATENT DOCUMENTS

DE         4136296 A1  *  5/1993
DE        19946100 A1  *  4/2001

OTHER PUBLICATIONS

Machine translation of DE19946100.*
Machine translation of DE 4136296.*

* cited by examiner

*Primary Examiner* — Marcus Charles
*Assistant Examiner* — Yamilka Pinero Medina
(74) *Attorney, Agent, or Firm* — William J. Benman; Benman, Brown & Williams (57) ABSTRACT

An arrangement for adjusting the position of handlebars on a vehicle including a first mechanism for effecting rotation of the handlebars about a first axis in response to a first control signal; a second mechanism for effecting translation of the handlebars along a longitudinal axis in response to a second control signal; and a control system for providing the first and second control signals. In the illustrative embodiment, the inventive system includes a first support secured to the vehicle; a second support operationally coupled to the first support and adapted for rotational movement about a first axis; a first actuator for rotating the second support over an angular extent about the first axis; a third support coupled to the second support for translational movement along a second axis, the second axis being coaxial with a longitudinal axis of the third support and transverse to the first axis; a second actuator for effecting movement of the third support relative to the second support; and a control system for driving the first and second actuators.

13 Claims, 10 Drawing Sheets

SYSTEM AND METHOD FOR CONTINUOUSLY VARIABLE MOTORIZED ADJUSTMENT OF MOTORCYCLE HANDLEBARS

BACKGROUND OF THE INVENTION

1. Field of the Invention

The present invention relates to motorcycles, bicycles and other vehicles with handlebars. More specifically, the present invention relates to systems and techniques for providing adjusting the position of the handlebars used on such vehicles.

2. Description of the Related Art

It is well-known in the motorcycle community that the typically fixed position of the handlebars has numerous limitations including: 1) a suboptimal positioning of the handlebars for a rider; 2) even if optimal at one time, the fixed handlebar position can be uncomfortable for a rider on another occasion due to injury, illness, weight gain or a variety of other changes in the riders condition or mood; and/or 3) the position of the handlebars, even if comfortable at the start of a ride, can become uncomfortable over time after long hours on the road.

Accordingly, a need has existed in the art for an apparatus and method for adjusting the position of handlebars for motorcycles and other similar vehicles. While adjustable handlebars are known in the art, these conventional systems typically require the user to adjust the handlebar positions mechanically and by hand. This is slow, cumbersome and typically provides a discrete set of position options as opposed to a continuous set of position options.

Hence, a need remains in the art for an easy to use motorized system and method for adjusting motorcycle handle bars over a continuous range of motion.

SUMMARY OF THE INVENTION

The need in the art is addressed by the system and method of the present invention. The inventive system includes an arrangement for adjusting the position of handlebars on a vehicle including a first mechanism for effecting rotation of the handlebars about a first axis in response to a first control signal; a second mechanism for effecting translation of the handlebars along a longitudinal axis in response to a second control signal; and a control system for providing the first and second control signals.

In the illustrative embodiment, the inventive system includes a first support secured to the vehicle; a second support operationally coupled to the first support and adapted for rotational movement about a first axis; a first actuator for rotating the second support over an angular extent about the first axis; a third support coupled to the second support for translational movement along a second axis, the second axis being coaxial with a longitudinal axis of the third support and transverse to the first axis; a second actuator for effecting movement of the third support relative to the second support; and a control system for driving the first and second actuators.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
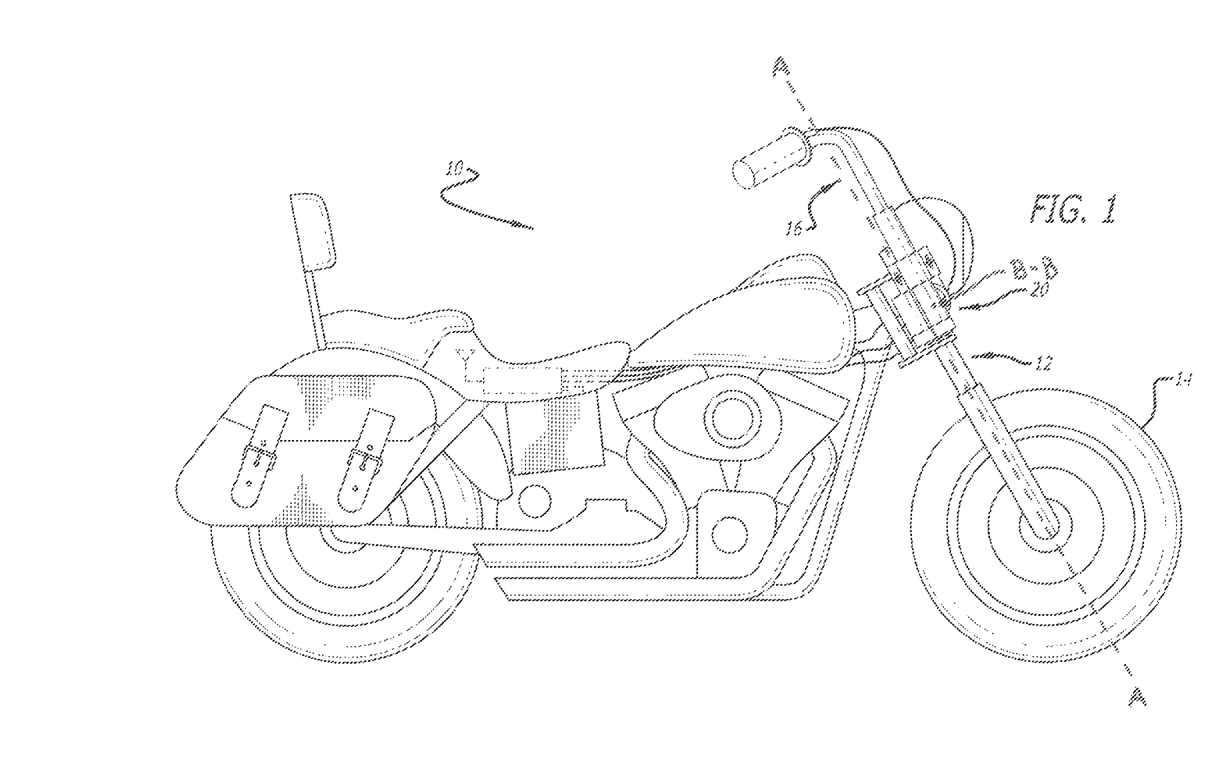
FIG. 1 is a side view of a motorcycle implemented in accordance with an illustrative embodiment of the present teachings.

FIG. 1 is a side view of a motorcycle implemented in accordance with an illustrative embodiment of the present teachings. As shown in the figure, the motorcycle 10 has a fork 12 at which a wheel 14 is mounted. The fork 12 is parallel to a first (longitudinal) axis A-A. Handlebars 16 extend from the fork 12 through the handlebar adjustment mechanism 20 of the present invention.

Figure 2:
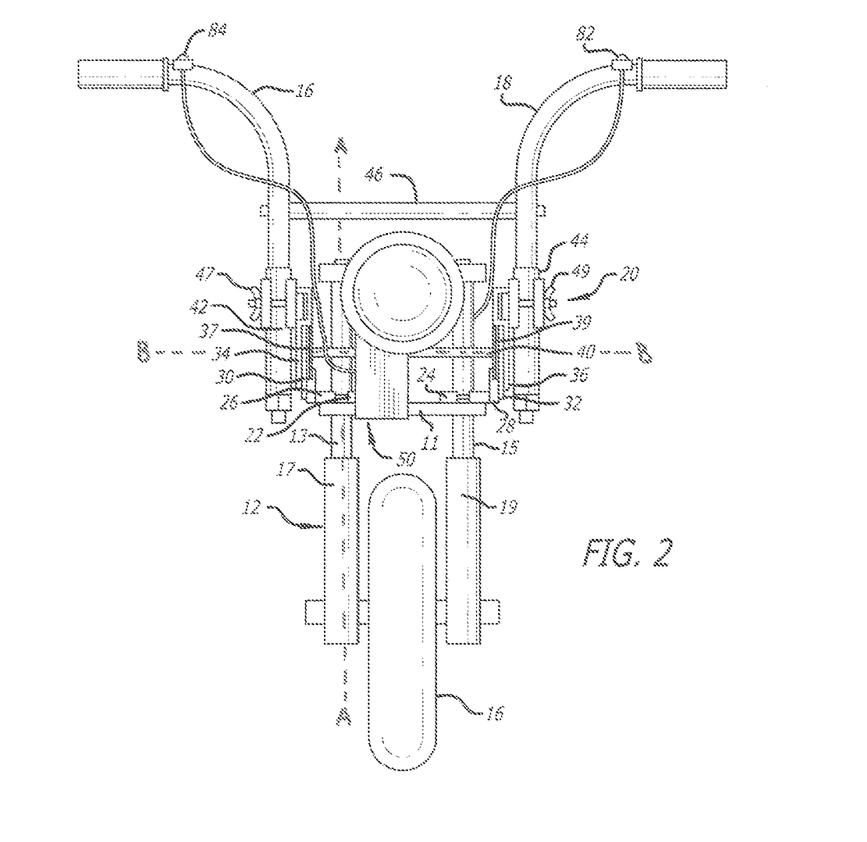
FIG. 2 is a front view of the motorcycle depicted in FIG. 1.

FIG. 2 is a front view of the motorcycle depicted in FIG. 1. As shown in FIG. 2, first and second prongs 13 and 15 engage first and second shock absorbers 17 and 19. The handlebar adjustment system 20 of the present invention is secured to the fork 12 on a crossbar 11 between first and second prongs 13 and 15 of the fork 12 of the motorcycle 10. The mechanism 20 includes first and second mounts 22 and 24.

Figure 3A:
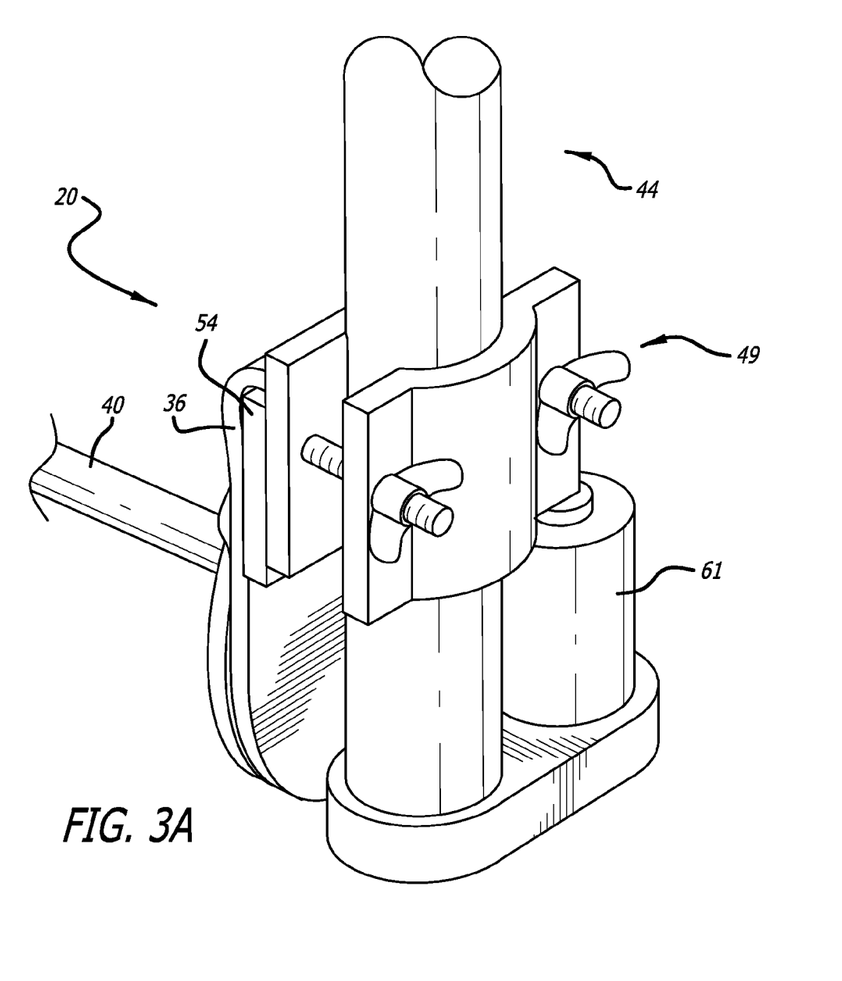
FIG. 3a is a magnified front quarterly perspective left side view of a portion of the mechanism depicted in FIG. 2.

FIG. 3a is a magnified front quarterly perspective left side view of a portion of the mechanism depicted in FIG. 2.

Figure 3B:
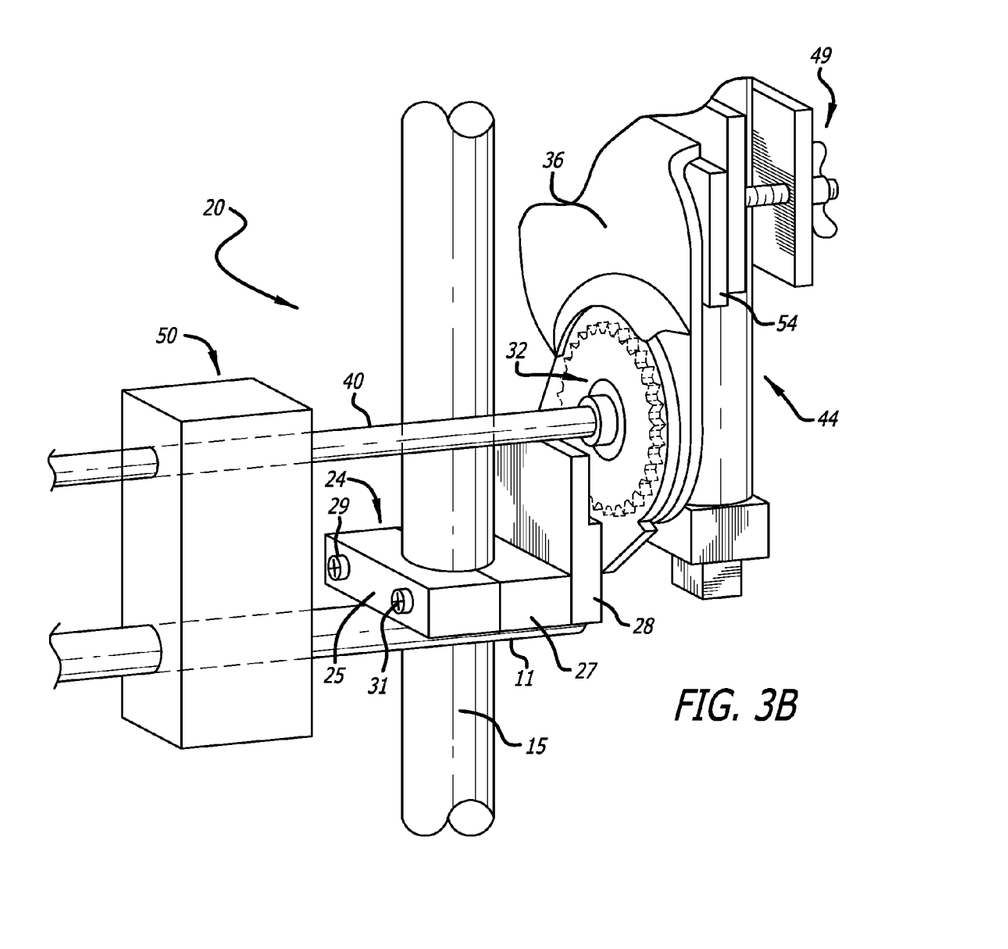
FIG. 3b is a magnified front quarterly perspective right side view of a portion of one of the mechanism depicted in FIG. 2.

FIG. 3b is a magnified front quarterly perspective right side view of a portion of one of the mechanism depicted in FIG. 2.

As shown in FIGS. 2, 3a and 3b, each mount 22 and 24 includes two pieces 25 and 27 which are secured by bolts 29 and 31 to clamp the mechanism to the fork 12. As shown in FIG. 2, the second piece of the first mount 22 has a vertical portion 26 to which a first reclining gear mechanism 30 is secured and the second piece 27 of the second mount 24 has a vertical portion 28 to which a second reclining gear mechanism 32 is secured. The gears 30 and 32 are driven by a drive motor 50 mounted on the crossbar 11 through a shaft 40. As discussed more fully below, when actuated, the axes of rotation of the first and second gear mechanisms provide a pivot point or axis of rotation (B-B) for the handle bars in accordance with the present teachings. The axis of rotation B-B is off-axis relative to the axle of the motorcycle and transverse to the longitudinal axis A-A of the fork 12.

In the best mode, the reclining gears 30 and 32 are implemented with seat back swivel control mechanisms known and used in the automobile industry such as that disclosed and claimed in U.S. Pat. No. 7,513,573 entitled Continuous Recliner, issued Apr. 7, 2009 to Wahls et al. the teachings of which are incorporated herein by reference. These reclining gear mechanisms 30 and 32 along with associated drive motor 50 may be purchased from Suzhou Chuangtou Machinery and Electrical Technology Co. Ltd. (Model: TJX-K5 Recliner, Power slider, Calf Support) and other manufacturers. Inasmuch as such off-the-shelf mechanisms are optimized for automobile seats, some custom modifications may be required to remove superfluous and unnecessary components for a given application as will be appreciated by one of ordinary skill in the art.

As shown in FIGS. 3a and 3b, the first and second gear mechanisms 30 and 32 are mounted to first and second telescoping supports or risers 42 and 44 via first and second clamps 47 and 49 respectively. As shown in FIG. 3, the portion of each gear 30, 32 adapted to rotate about the shaft 40 is coupled through a vertically extending flange 34, 36 to an associated support 42, 44 through an associated spacer 52 (not shown) and 54 respectively.

Figure 4A:
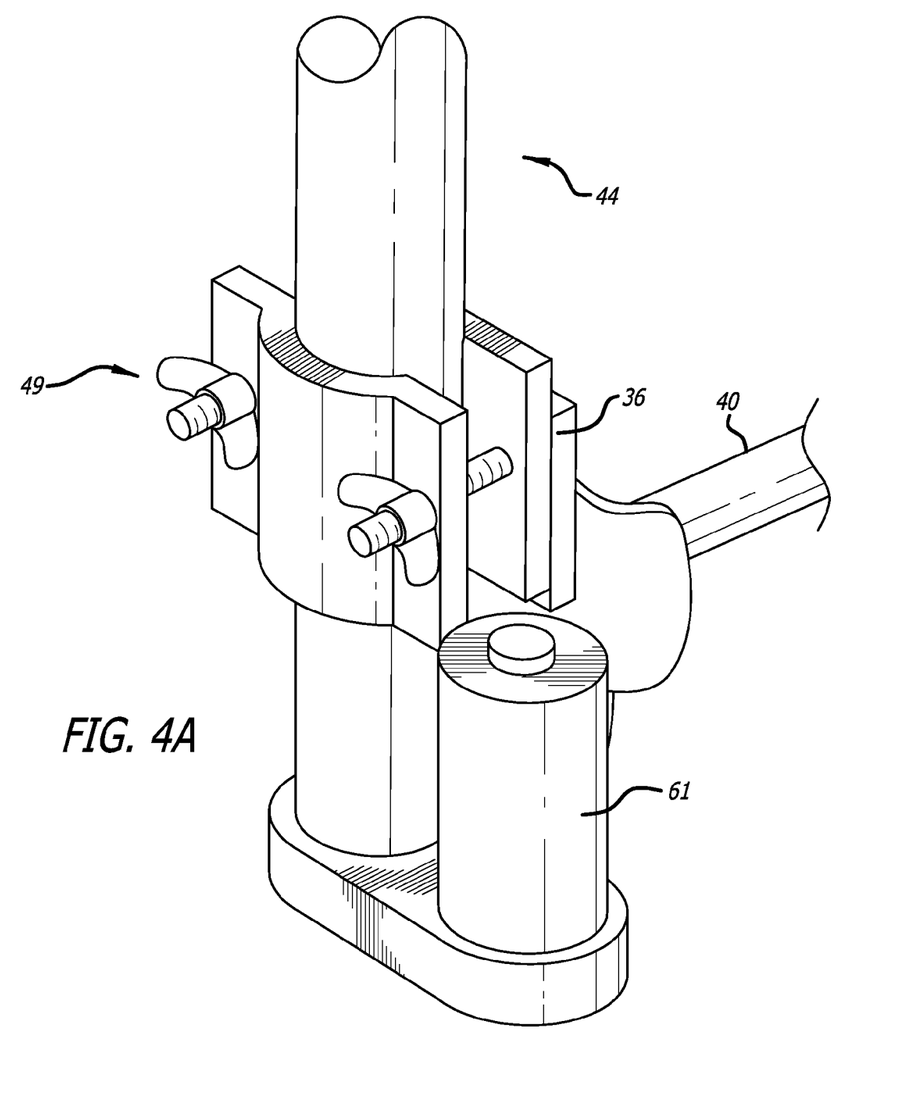
FIG. 4a is a magnified rear quarterly perspective left side view of a portion of the mechanism depicted in FIG. 2.

FIG. 4a is a magnified rear quarterly perspective left side view of a portion of the mechanism depicted in FIG. 2.

Figure 4B:
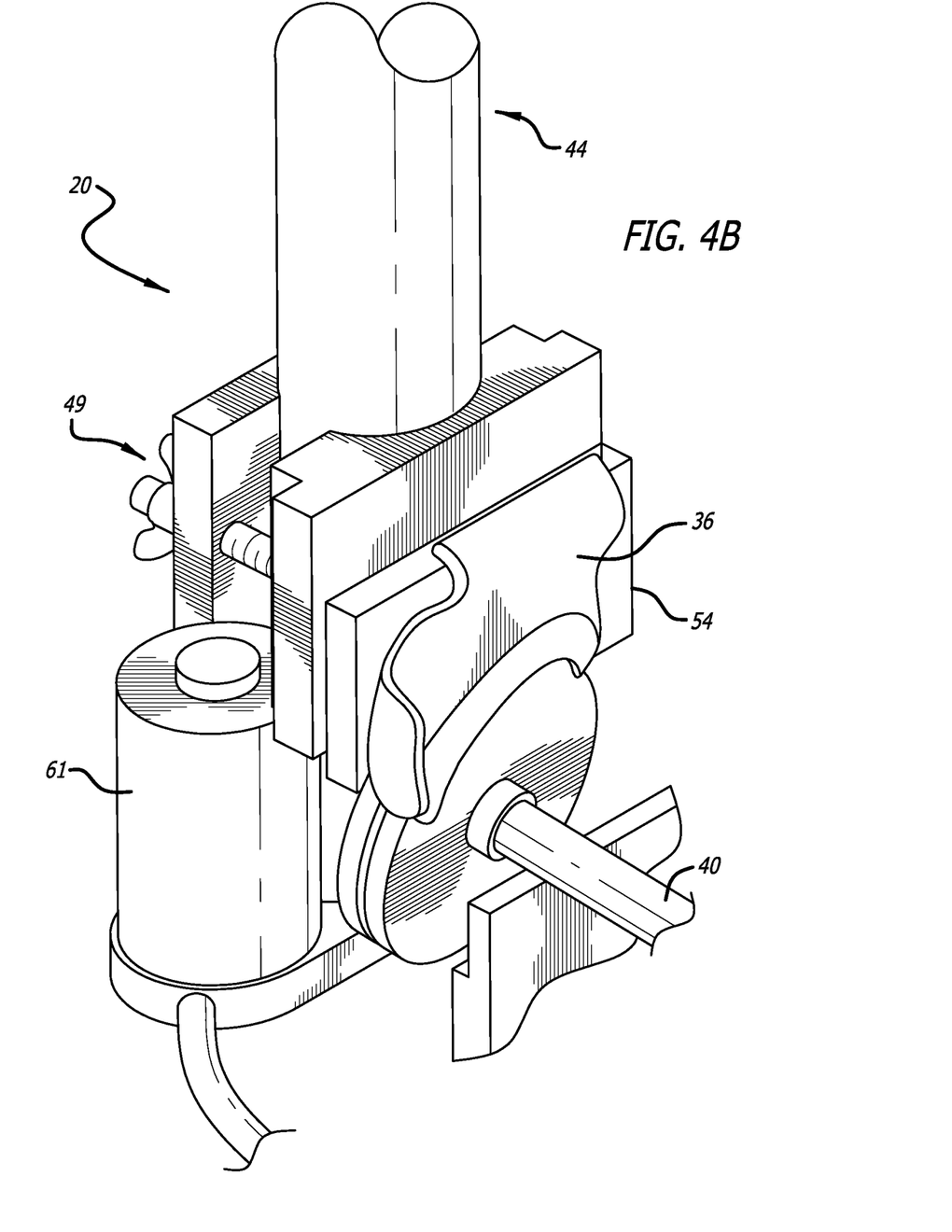
FIG. 4b is a magnified rear quarterly perspective right side view of a portion of one of the mechanism depicted in FIG. 2.

FIG. 4b is a magnified rear quarterly perspective right side view of a portion of one of the mechanism depicted in FIG. 2.

FIGS. 4a and 4b show second and third motors 60 and 61 mounted behind and coupled to associated telescoping supports 42 and 44, respectively. Actuation of the motors causes the risers 42 and 44 to translate back and forth along a longitudinal axis extending therethrough and thereby extend and retract the first and second handlebars 16 and 18 respectively. For structural integrity, the handlebars 16 and 18 are coupled via second crossbar 46.

Figure 5A:
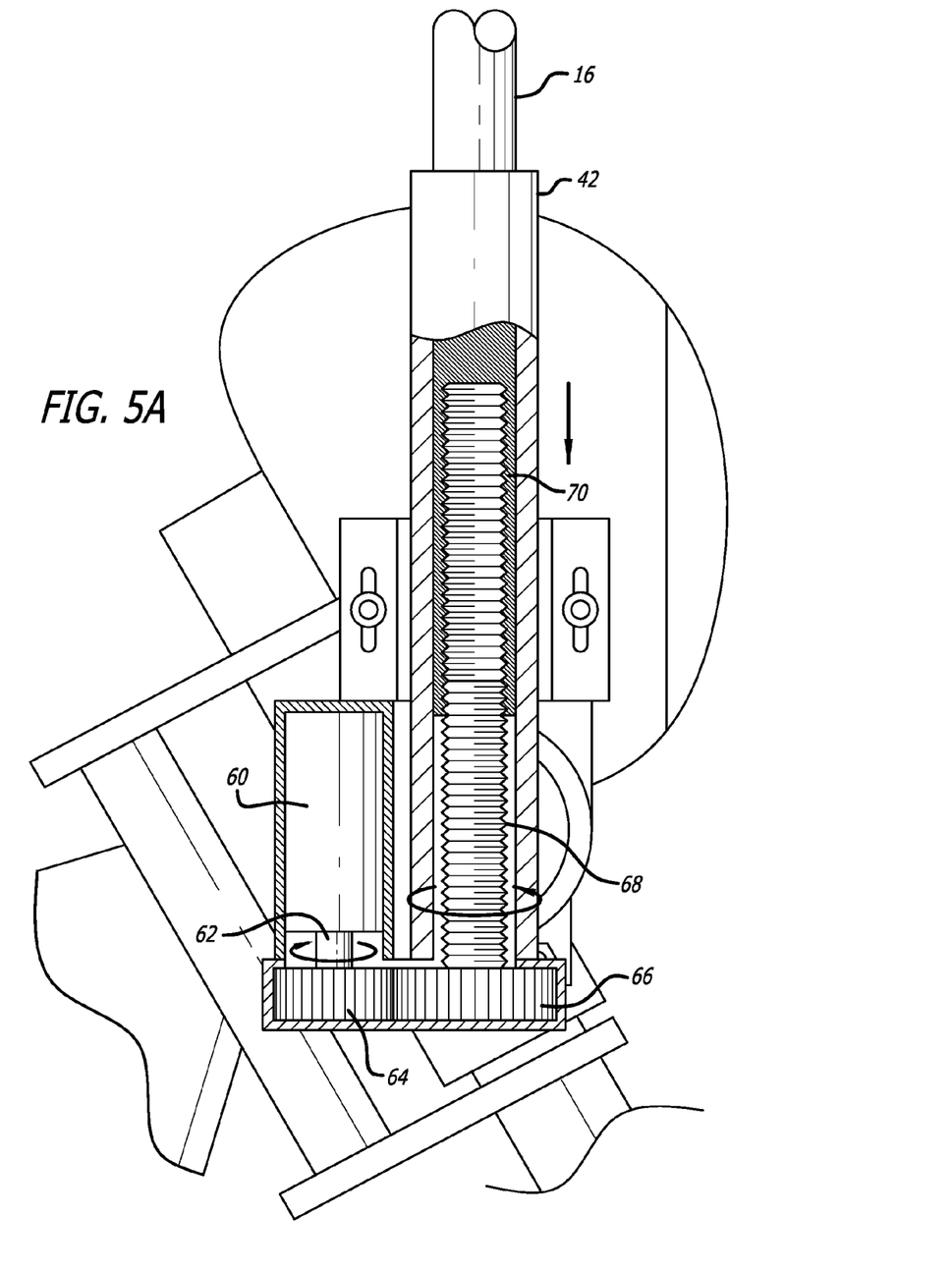
FIG. 5a is a side elevational view of a motor and gear assembly of the mechanism of the present invention partially cut away to show the inner gear structure thereof in a first, extended, position of the handlebars.

FIG. 5a is a side elevational view of a motor and gear assembly of the mechanism of the present invention partially cut away to show the inner gear structure thereof in a first, extended, position of the handlebars.

Figure 5B:
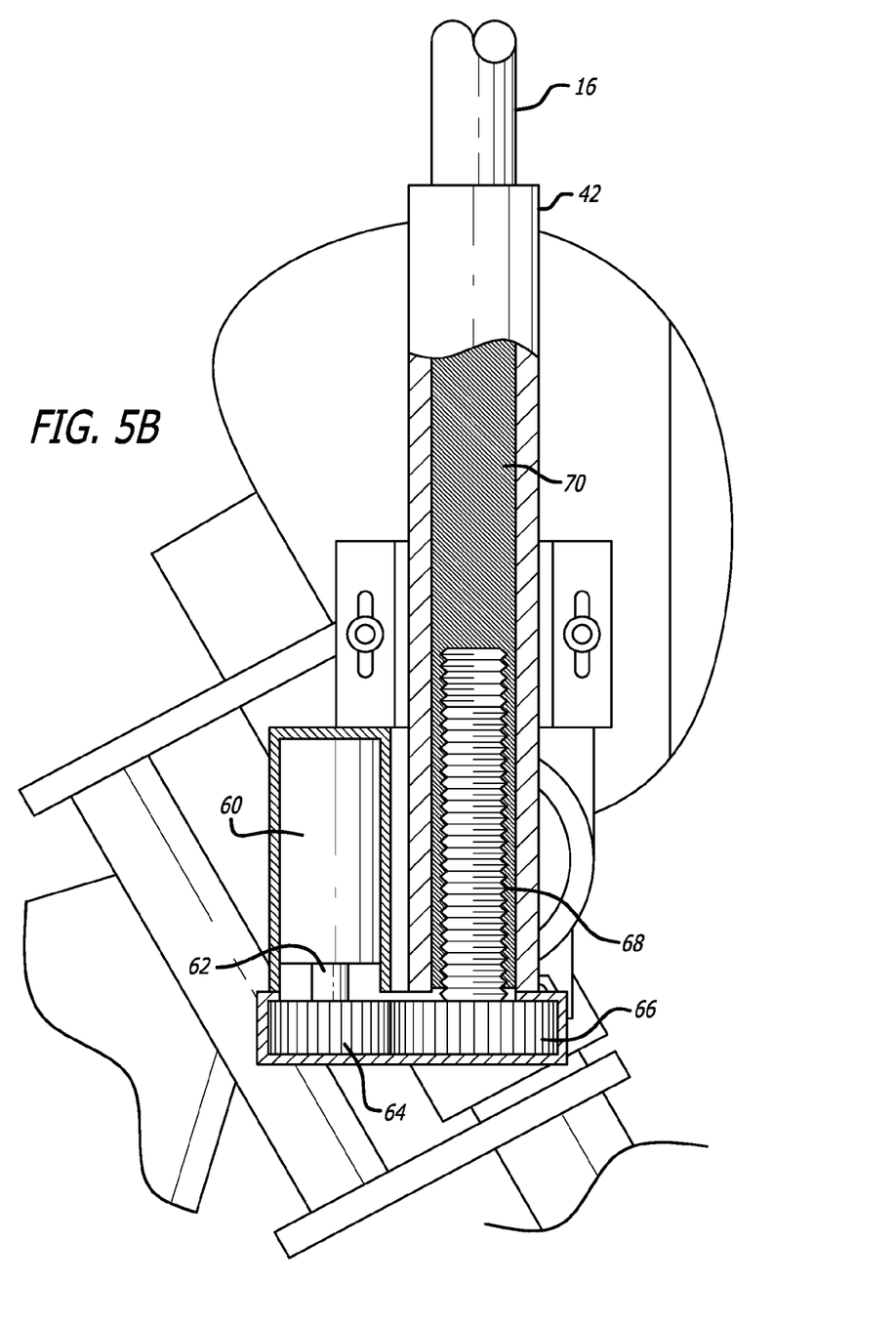
FIG. 5b is a side elevational view of a motor and gear assembly of the mechanism of the present invention partially cut away to show the inner gear structure thereof in a second, retracted, position of the handlebars.

FIG. 5b is a side elevational view of a motor and gear assembly of the mechanism of the present invention partially cut away to show the inner gear structure thereof in a second, retracted, position of the handlebars.

The motor 60 is coupled to a first gear 64 through a short shaft 62. The first gear engages a second gear 66 at the base of the riser 42. A threaded rod 68 engages matching threads 70 in the inner wall of the riser 42. Hence, the gears and threads translate rotational motion of the motor into linear motion of the handlebars.

Although only one telescoping gear mechanism is shown, it will be understood by one of ordinary skill in the art that the second telescoping gear and motor are of the same design and operation.

The second and third motors 60 and 61 and gears are of conventional linear actuator design and may be purchased from Progressive Automations or other manufacturers. See http://www.progressiveautomationscom/.

Figure 6:
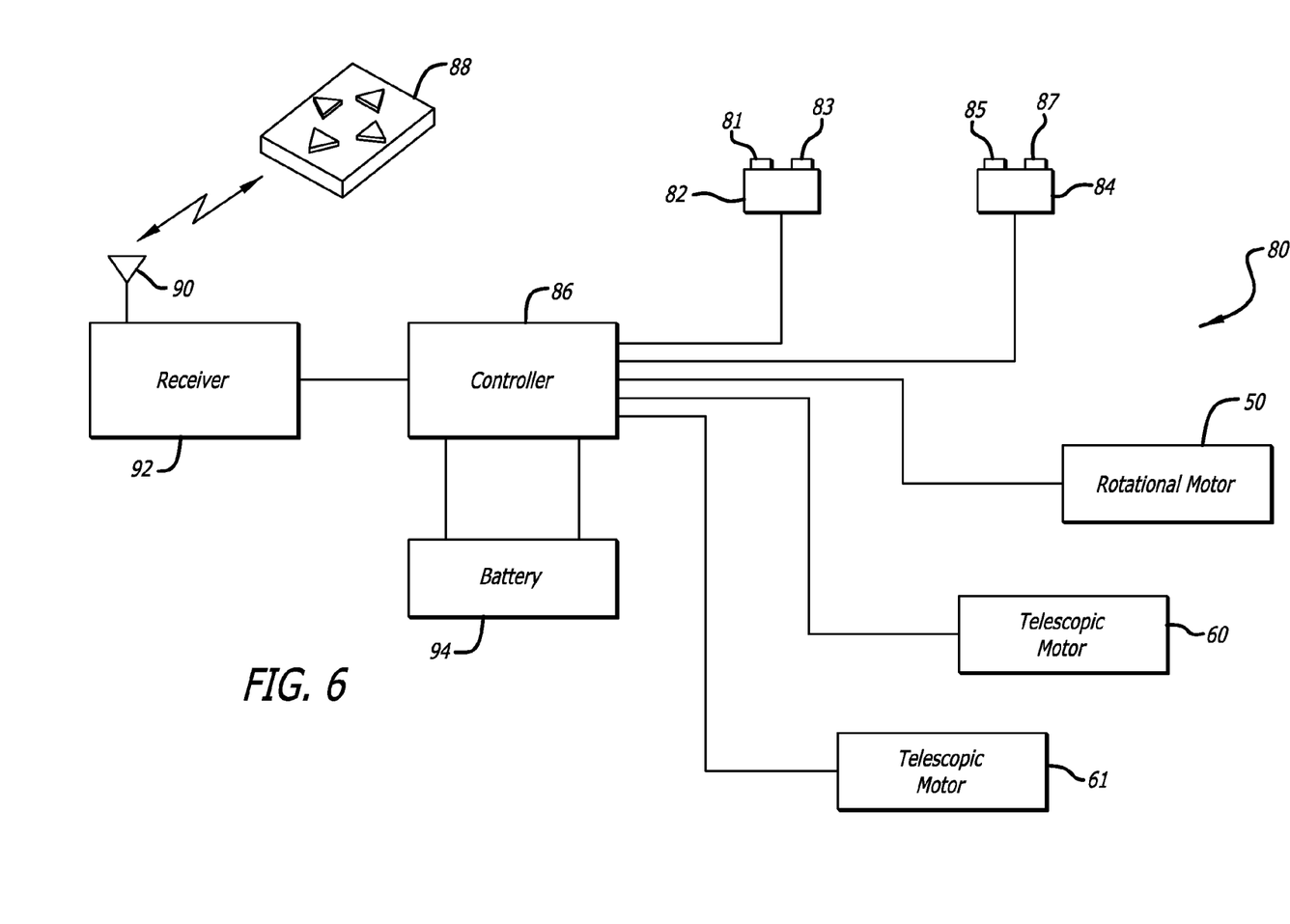
FIG. 6 shows a simplified block diagram of a control system used in the present invention.

FIG. 6 shows a simplified block diagram of a control system used in the present invention. As shown in FIG. 6, the control system 80 includes switch modules 82 and 84 mounted on the handlebars 16 and 18 respectively. (See FIG. 2.) The first switch module 82 includes first and second switches 81 and 83 that provide up and down handle bar position control signals respectively. The second switch module 84 has third and fourth switches 85 and 87 that provide forward and back handlebar tilt or swivel control signals respectively. The switches may be of conventional design and construction. In the illustrative embodiment, the switches were purchased as Switch Mount Stand Alone Two Button switches from Highway Dirt Bikes Company. http://www.highwaydirtbikes.com/HDB_Shop/

These signals are fed into a controller 86. The controller 86 may be implemented with a simple analog circuit, a digital circuit or a microprocessor. The controller 86 is adapted to receive up, down, forward and back position control signals from a remote control unit 88 via an antenna 90 and a receiver 92. When powered by a battery 94 or other source of power, the controller 86 provides precision drive signals to the rotational motor 50 and the telescopic motors 60 and 61. This enables the advantageous o operation of the invention as depicted in FIGS. 7a-c.

Figure 7A:
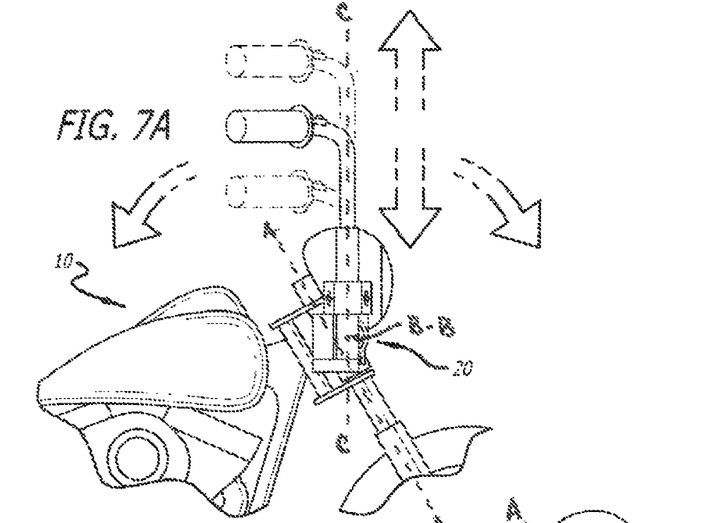
FIG. 7a is a side elevational view of a portion of the motorcycle of FIG. 1 illustrating the telescopic adjustment of the handlebars afforded by the handlebar position control mechanism of the present invention.

FIG. 7a is a side elevational view of a portion of the motorcycle 10 of FIG. 1 illustrating the telescopic adjustment of the handlebars afforded by the handlebar position control mechanism 20 of the present invention. Note the up and down positions shown in phantom relative to a nominal middle position thereof as the handlebars are translated along a third axis C-C, relative and transverse to the second axis B-B, at an approximate 90° tilt angle about axis B-B relative to a ground plane (surface on which the motorcycle rests) in accordance with the present teachings.

Figures 7B, 7C:
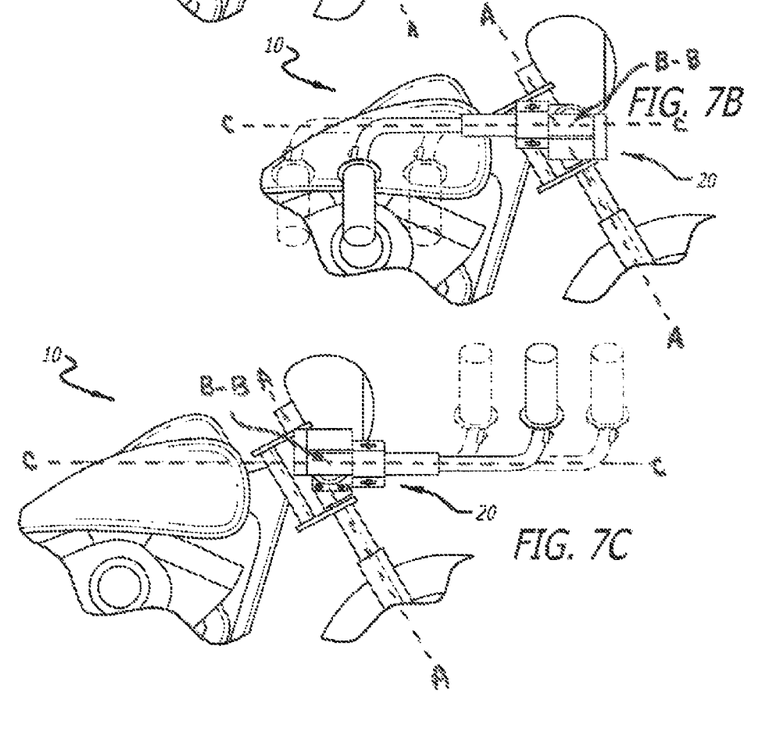
FIG. 7b is a side elevational view of a portion of the motorcycle of FIG. 1 illustrating the rearward tilt adjustment of the handlebars afforded by the handlebar position control mechanism of the present invention.
FIG. 7c is a side elevational view of a portion of the motorcycle of FIG. 1 illustrating the forward tilt adjustment of the handlebars afforded by the handlebar position control mechanism of the present invention.

FIG. 7b is a side elevational view of a portion of the motorcycle of FIG. 1 illustrating the rearward tilt adjustment of the handlebars afforded by the handlebar position control mechanism of the present invention as the handlebars are translated along a third axis C-C, relative and transverse to the second axis B-B, at an approximate 180° tilt angle about axis B-B relative to the ground plane in accordance with the present teachings.

FIG. 7c is a side elevational view of a portion of the motorcycle of FIG. 1 illustrating the forward tilt adjustment of the handlebars afforded by the handlebar position control mechanism of the present invention as the handlebars are translated along a third axis C-C, relative and transverse to the second axis B-B, at an approximate 0° tilt angle about axis B-B relative to the ground plane in accordance with the present teachings.

As shown in FIGS. 7a-c, in the illustrative embodiment, the present invention allows for approximately ±180° of tilt or swivel and 12" of telescopic lift of the handlebars 16, 18. However, those skilled in the art will appreciate that the present teachings are not limited to the range of motion selected for a particular application.

Thus, the present invention has been described herein with reference to a particular embodiment for a particular application. Those having ordinary skill in the art and access to the present teachings will recognize additional modifications, applications and embodiments within the scope thereof. For example, the present invention is not limited to use on motorcycles. Those of ordinary skill in the art will appreciate that the present invention can be used on any vehicle having a steering control such as a bicycle or other wheeled vehicle. Further, the invention is not limited to use on vehicles with handlebars. That is, the present teachings may be used on a vehicle with a single stalk steering control. Those of ordinary skill in the art will also appreciate that the invention is not limited to the use of electric motors as actuators. Hydraulic, pneumatic and/or solenoid actuators may be used as well. The remote control could be voice activated and helmet mounted.

It is therefore intended by the appended claims to cover any and all such applications, modifications and embodiments within the scope of the present invention.

Accordingly,

What is claimed is:

1. A motorized system for adjusting the position of handlebars on a vehicle supported by a wheel through a fork, having a first longitudinal axis, coupled to the wheel at an axle thereof, said system comprising:
   a first support secured to the fork;
   a second support including a first actuator operationally coupled to said first support and said handlebars
   for rotating said second support over an angular extent about a second axis, off-axis relative to said axle, thereby changing a tilt angle of said handlebars relative to the longitudinal axis of the fork;
   a third support, including a second actuator, coupled to said second support and said handlebars for
   effecting translational movement of said third support relative to said first support along a third axis, said third axis being a longitudinal axis of the third support and transverse to the second axis, whereby the length of said handlebars, relative to said second axis, is adjusted; and
   a controller for actuating said first and second actuators.

2. The invention of claim 1 wherein said first support is coupled to a fork of a vehicle.

3. The invention of claim 1 wherein said vehicle is a motorcycle.

4. The invention of claim 1 wherein said vehicle is a bicycle.

5. The invention of claim 1 wherein said first support is coupled to said second support via a set of interlocking gears.

6. The invention of claim 5 wherein at least one of said gears is coupled to a first motor included in the first actuator.

7. The invention of claim 6 wherein said third support comprises first and second tubes to which said handlebars are coupled.

8. The invention of claim 7 wherein each of said tubes includes a threaded rod to which a bolt is coupled whereby actuation of said rod relative to said bolt causes said tube and said handlebar to translate along said longitudinal axis.

9. The invention of claim 8 wherein said second actuator includes a second motor for actuation of said rod relative to said bolt.

10. The invention of claim 1 wherein said first actuator includes a first motor adapted to effect a change in angle of handlebar position.

11. The invention of claim 1 wherein said controller includes a control system for translating signals from switches mounted on said handlebars or signals from a remote controller into drive signals for said first and second motors.

12. The invention of claim 1 wherein said controller includes switches mounted on said handlebars.

13. The invention of claim 1 wherein said controller includes a remote control transceiver and receiver.

* * * * *